United States Patent [19]
Yu et al.

[11] Patent Number: 5,930,804
[45] Date of Patent: Jul. 27, 1999

[54] WEB-BASED BIOMETRIC AUTHENTICATION SYSTEM AND METHOD

[75] Inventors: Yuan-Pin Yu, Sunnyvale; Stephen Wong, San Francisco; Mark B. Hoffberg, Palo Alto, all of Calif.

[73] Assignee: Philips Electronics North America Corporation, New York, N.Y.

[21] Appl. No.: 08/871,035

[22] Filed: Jun. 9, 1997

[51] Int. Cl.[6] .................................................. G06F 9/00
[52] U.S. Cl. ........................................ 707/104; 707/100
[58] Field of Search ......................................... 707/1–205

[56] References Cited

U.S. PATENT DOCUMENTS

| | | | |
|---|---|---|---|
| 5,229,764 | 7/1993 | Matchett et al. | 340/825.34 |
| 5,280,527 | 1/1994 | Gullman et al. | 380/23 |
| 5,615,277 | 3/1997 | Hoffman . | |
| 5,682,142 | 10/1997 | Loosmore et al. | 340/572 |
| 5,706,427 | 1/1998 | Tabuki | 395/187.01 |
| 5,719,950 | 2/1998 | Osten et al. | 382/115 |
| 5,757,916 | 5/1998 | MacDoran et al. | 380/25 |

FOREIGN PATENT DOCUMENTS

| | | |
|---|---|---|
| 0762261A2 | 3/1997 | European Pat. Off. . |
| 9708868A1 | 3/1997 | WIPO . |

*Primary Examiner*—Paul R. Lintz
*Assistant Examiner*—John G. Mills, III

[57] ABSTRACT

A Web-based authentication system and method, the system comprising at least one Web client station, at least one Web server station and an authentication center. The Web client station is linked to a Web cloud, and provides selected biometric data of an individual who is using the Web client station. The Web server station is also linked to the Web cloud. The authentication center is linked to at least one of the Web client and Web server stations so as to receive the biometric data. The authentication center, having records of one or more enrolled individuals, provides for comparison of the provided data with selected records. The method comprises the steps of (i) establishing parameters associated with selected biometric characteristics to be used in authentication; (ii) acquiring, at the Web client station, biometric data in accordance with the parameters; (iii) receiving, at an authentication center, a message that includes biometric data; (iv) selecting, at the authentication center, one or more records from among records associated with one or more enrolled individuals; and (v) comparing the received data with selected records. The comparisons of the system and method are to determine whether the so-compared live data sufficiently matches the selected records so as to authenticate the individual seeking access of the Web server station, which access is typically to information, services and other resources provided by one or more application servers associated with the Web server station.

14 Claims, 4 Drawing Sheets

WEB-BASED BIOMETRIC AUTHENTICATION SYSTEM AND METHOD

BACKGROUND OF THE INVENTION

This invention relates to biometric authentication, particularly to systems and methods for biometric authentication of individuals involved in transactions employing the World Wide Web.

Broadly described, the World Wide Web (the "Web") is a decentralized, electronic database service offering a universe of dynamically connected information, the information being in any of various media and being relatively easily found by and made accessible to individuals exploring ("surfing") that universe ("Webspace"). More specifically, the Web is a distributed, hypertext system comprising hypermedia documents, Web servers and Web clients. Web clients include software programs commonly known as browsers. Browsers typically reside on an individual's personal computer and, among other things, provide for exploring the Web so as to find and access Web documents.

Web servers are software programs that support various features, including being compatible with one or more standard protocols, e.g., the HyperText Transport Protocol ("HTTP"), the well-known, native protocol of the Web generally unifying its information. Web servers put hypermedia documents on the Web and otherwise make resources associated with the server available to Web clients. Web servers not only make documents and resources accessible to Web clients, but also direct specific documents to clients and complete transactions responsive to each client's input. Web servers, being decentralized but interconnected, give the Web its distributed characteristic.

Web documents ("pages") are constructed in conformity with one of various accepted formats or languages, e.g., HyperText Markup Language ("HTML"). The formats support, among other things, the Web's hypermedia and hypertext characteristics. As to the hypermedia characteristic, Web documents can, and generally do, combine content from one or more of the various media including text, graphics, audio and video. As to the hypertext characteristic, Web documents can, and generally do, contain electronic links to related Web documents. Selecting the link causes the browser to (i) connect to a Web server associated with that link, (ii) request the linked document and (iii) if the Web client satisfies the server's security requirements, receive and display the document.

However described, the Web has had rapid acceptance and growth. The Web's growth is reflected by the number of Web servers going into service in a few years ago: in June 1993, 130 public servers; in November 1994, almost 9,000 public servers; in February, 1995, over 27,000 public servers. The number of servers currently is much greater still. The Web's acceptance is reflected by its application across institutions, whether government, corporate, commercial, education, civic or otherwise. Its acceptance and growth positions the Web to transform the way people create, access, and use information which, in turn, positions the Web to transform the institutions themselves.

The security of Web information and transactions has been identified as a significant problem. At the center of the problem are so-called crackers: individuals who seek to access computers, such as Web servers, so as to conduct pranks, vandalism, espionage or other illegitimate activities. Web security responds to these activities and, among other things, strives to maintain the confidentiality and integrity of information, both as resident on servers and as communicated in Web transactions. Increasing the vulnerability to crackers is that the Web is an open system available to anyone in possession of readily available, affordable technology.

One important Web security issue is authentication. While authentication takes various forms, authentication of individuals is particularly desirable. This authentication is directed to verifying that the individual seeking access to and/or through a Web server is in fact who that individual claims to be, and not an impersonator. This authentication relies on verification being performed at or above a predetermined minimum level of confidence. At the same time, authentication is generally an early hurdle that the individual must clear to conduct Web transactions with the server (typically the individual is subject to other security measures mediating access to system information, services and other resources).

The traditional method for authenticating individuals has relied on secret passwords. Password-only authentication has the benefit that it can be implemented entirely in software. However, password-only authentication has a number of disadvantages. First, passwords can be cumbersome. For example, a password's viability is enhanced, among other ways, by increasing its length, by controlling its composition and by its being frequently changed. However, using these techniques to enhance password viability tends to render the password increasingly cumbersome.

Second, passwords can be forgotten, lost, stolen or otherwise compromised. Password's that are written down are readily stolen. Passwords can be inadvertently disclosed to crackers via various ploys, including by crackers observing the password's entry on a keyboard. Passwords can also be illegitimately discovered by, for example, brute-force trial and error. Moreover, passwords can be intercepted as they are transported from the Web client to the desired server. Passwords can also be compromised by a cracker gaining access to a server's file of registered passwords which files generally are maintained to verify submitted passwords.

At least for these reasons, password-only authentication fails to provide adequate security. At the same time, Web-based applications are flooding into areas that can benefit from enhanced security. Examples of such Web-based applications include: commercial transactions (e.g., the purchase and sale of goods), banking transactions (e.g., electronic funds transfer), and medical transactions (e.g., provision of medical records in emergency situations).

Accordingly, a need exists for improved Web-based security measures, and methods to implement such measures. Moreover, a need exists for improved Web-based authentication systems and methods.

SUMMARY OF THE INVENTION

An object of this invention is to provide improved Web-based security measures, and methods to implement such measures and, moreover, to provide improved Web-based authentication systems and methods.

Accordingly to one aspect of the invention, a Web-based authentication system is provided that uses a Web cloud as a communication medium. The system comprises, in an embodiment, at least one Web client station, at least one Web server station and an authentication center. Access of (i.e., to and/or through) the Web server station via the Web cloud is sought by the individual using the Web client station, which access is dependent on authentication of the individual. The Web client station is linked to the Web cloud, and provides selected biometric data representing biometric characteristics of an individual who is using the Web client station. The Web server station is also linked to the Web cloud. The authentication center is linked to at least one of the Web client and Web server stations so as to receive the biometric data provided by the Web client station. The authentication center which has records of biometric data of one or more enrolled individuals, provides for comparison of the provided data with selected records. The comparison is to determine whether the provided data sufficiently matches the selected records as to authenticate.

In another aspect of the invention, a method is provided for Web-based, biometric authentication of individuals who are using a Web client station, the individuals seeking access of (i.e., to and/or through) a Web server station. An embodiment of the method comprises the steps of (i) establishing parameters associated with selected biometric characteristics to be used in authentication; (ii) acquiring, at the Web client station, biometric data in accordance with the parameters; (iii) receiving, at an authentication center, a message that includes biometric data; (iv) selecting, at the authentication center, one or more records from among records associated with one or more enrolled individuals; and (v) comparing received biometric data with selected records, the comparison determining whether the so-compared biometric data sufficiently matches the selected records as to authenticate.

The various features of novelty which characterize the invention are pointed out with particularity in the claims annexed to and forming a part of this specification. For a better understanding of the invention, its operating advantages and specific objects attained by its use, reference should be made to the accompanying drawings and descriptive matter in which its preferred embodiments are illustrated and described, wherein like reference numerals identify the same or similar elements.

DETAILED DESCRIPTION OF THE PREFERRED EMBODIMENTS

The present invention contemplates Web-based biometric authentication systems and methods. Biometric authentication relies on the acquisition of data related to a biological feature so as to verify the claimed identity of an individual, generally in an automated methodology. Web-based authentication introduces the Web as the automation vehicle.

Authentication using biometric data exploits the fact that such characteristics (i) are relatively unique from individual to individual, (ii) are unchanging, and (iii) cannot be forgotten, lost, stolen, or otherwise compromised. In addition, non-Web-based authentication using biometric data has a substantial history and, accordingly, is relatively well-accepted in our society.

Authentication using biometric data, as described herein, is generally directed to verification that an individual is, in fact, who they claim to be. Broadly stated, verification generally compares the individual's submitted data, or data representative thereof (often referred to hereafter as "live data") to stored biometric data (often referred to hereafter as "records") associated with the person the individual claims to be.

However, it is to be understood that the systems and methods described herein is also directed to identification of individuals, without departing from the principles of the invention. By comparison to verification, biometric identification generally compares live data to the entire database of records so as to determine if there is a match and, if so, returns the identity of the person associated with the matching record. Biometric identification can be used in various applications, including, for instance, to identify unconscious individuals in need of medical attention and to identify crackers who seek or previously sought to breach a server or the authentication system itself (e.g., by matching live data to enrolled persons or by matching new enrollees to records of previous cracker attacks).

Authentication Systems.

Figure 1:
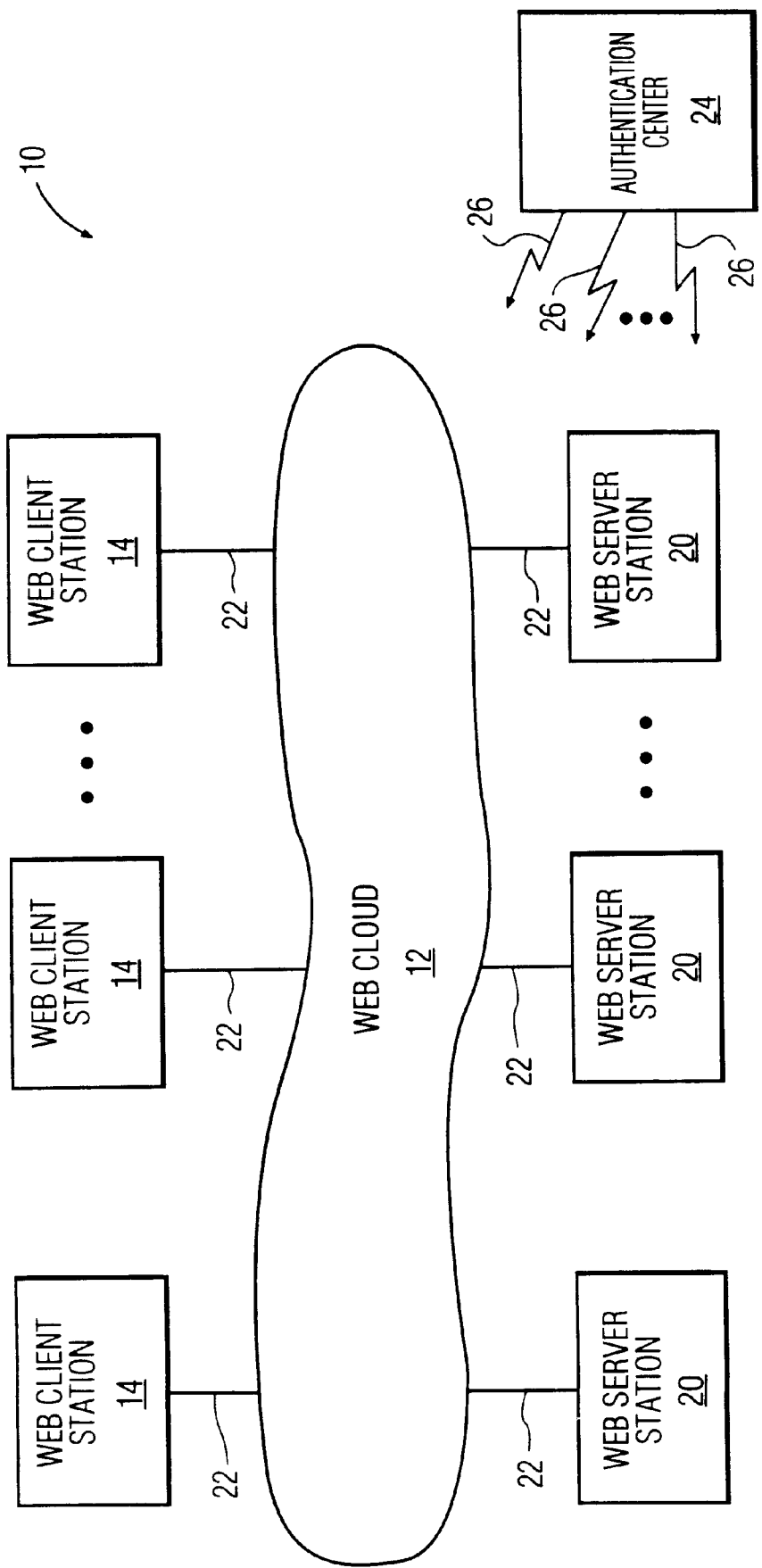
FIG. 1 is a block diagram of an embodiment of a Web-based biometric authentication system, according to the present invention.

As shown in FIG. 1, a Web-based biometric authentication system 10 according to the present invention comprises a Web cloud 12, one or more Web client stations 14, one or more Web server stations 20, Web connections 22, an authentication center 24, and one or more authentication center connections 26. While the elements of the system 10 are shown as logical devices, one of ordinary skill in the art would readily understand that each is associated with respective physical devices. For example: (i) the stations 14 and 20 typically are associated with, among other physical devices, computers, such as PCs and servers; (ii) the connections 22 and 26 typically are associated, among other physical devices, with wires, cables, fiber optics, radio signals or other physical connections; and (iii) the Web cloud 12 typically is associated with, among other physical devices, network components such as routers, bridges, computers, internets, intranets, extranets and other physical networks.

The Web cloud 10 represents a generalized communication medium, based on and supporting standard protocols of the Web (e.g., HTTP), for Web transactions among the Web's clients and servers. It represents either the Web of hundreds of magazine and newspaper articles or any other Web, public or private.

The Web connections 22 link each of the Web client stations 14 to the Web server stations 20 via the interposed Web cloud 10 so as to provide Web communications there among. The Web connections 22 preferably support HTTP, as well as a secure transport protocol. The secure transport protocol preferably is the Secure Sockets Layer ("SSL"). SSL is an open, nonproprietary protocol offered by Netscape Communication Corporation of Mountain View, California ("Netscape"). SSL is designed for use by Web clients and servers, providing for data encryption, server authentication, message integrity and, optionally, user certificates. As to data encryption, SSL allows a client and server to negotiate an encryption algorithm, such as a public key algorithm (e.g., RSA), and to communicate securely using encryption.

Notwithstanding the above discussion, it is to be recognized that other protocols can be used without departing from the principles of the invention, provided that the protocols both support transport security and maintain overall operation of the system 10. An example is the IIOP ("Internet Inter-ORB Protocol") of COBRA ("Collaborative Object Broker Request Architecture"), a standard specified by the OMG (Object Management Group)—a standard group of 700 computer and communication vendors that define distributed object computing interoperability).

The authentication center connections 26 preferably link the authentication center 24 to the Web cloud 12, so as to provide communication between the center 24 and the stations 14, 20. The authentication center connections 26 support a secure transport protocol, such as SSL, so as to provide a secure channel. The authentication center connections 26 can also support a standard protocol, e.g., HTTP, although it is to be recognized that the system can be configured in the absence of that support.

The authentication center connections 26 are depicted in FIG. 1 so as to indicate that the link need not be via the Web cloud 12. For example, the link can be made directly between the authentication center 24 and one or more of the Web client stations 14 and/or the Web server stations 20. In the case of a Web cloud link, the system 10 takes advantage of the Web's scalability with respect to both Web client stations 14 and Web server stations 20. In the case of a direct link, the system 10 takes advantage of the enhanced security generally associated with such links. In addition, the link can be both direct and via the Web cloud, which combination introduces the advantages of redundancy to those previously described, typically at only a marginal additional cost. It is to be recognized that each case is contemplated within the principles of the invention.

Figure 2:
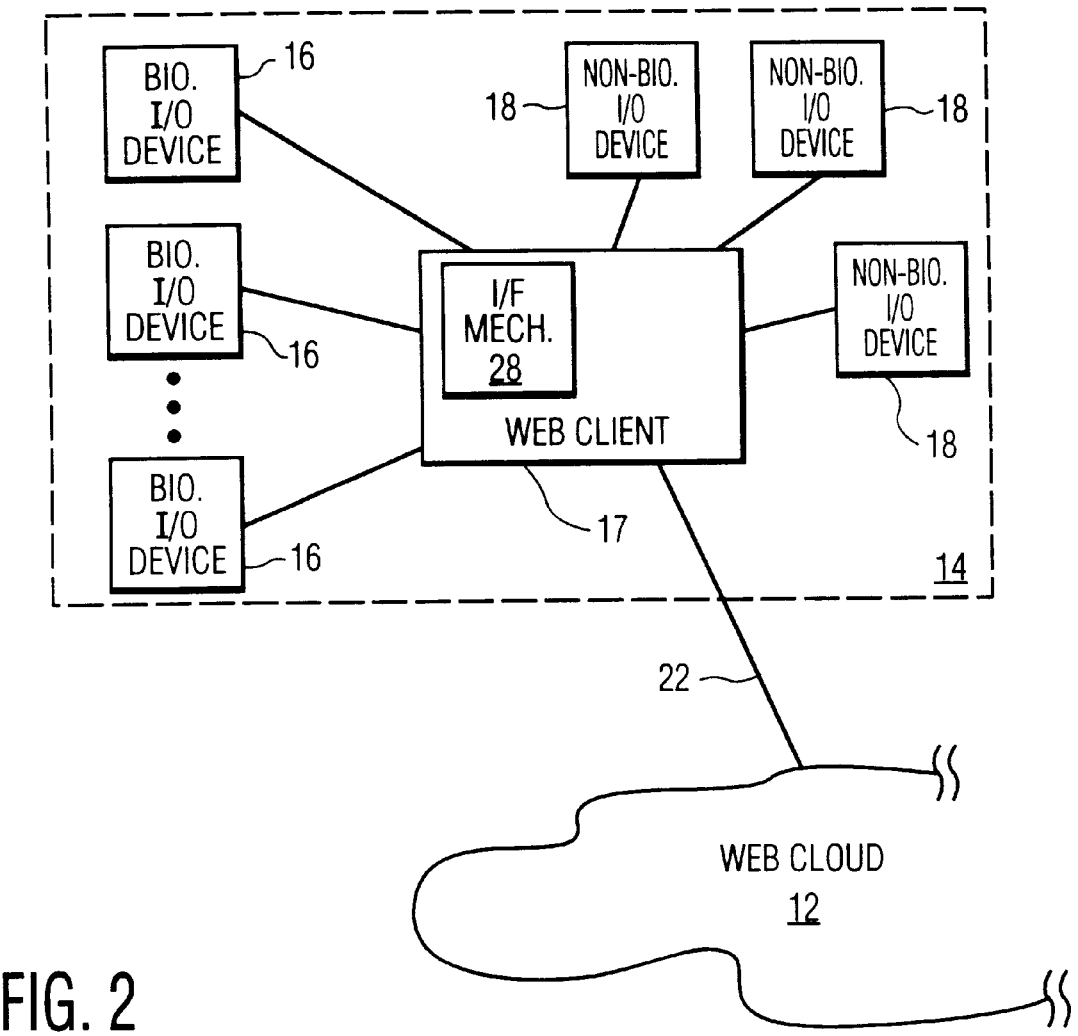
FIG. 2 is a block diagram of a client portion of FIG. 1, showing additional detail of the Web-based biometric authentication system, according to the present invention.

Turning to FIG. 2, an exemplary Web client station 14 from FIG. 1 is shown in greater detail. The Web client station 14 comprises one or more biometric I/O devices 16, one or more non-biometric I/O devices 18, and a Web client 17. Each of the devices 16 and 18 is linked to the Web client 17. In addition, the Web client station 14 is linked via the connection 22 to the Web cloud 12 at the Web client 17.

The Web client 17 preferably comprises any of the known browser programs, such as Netscape's Navigator-brand browser. Although browser programs are preferred, it is to be recognized that other Web clients can be used without departing from the principles of the invention, provided such clients are compatible with the system 10 and are able to perform the steps of an authentication method associated with the client station 14, as described below. It is also to be recognized that the type of Web client 17 can vary among the Web client stations 14, without departing from the principles of the invention.

The non-biometric I/O devices 18 preferably comprise products capable of inputting passwords and otherwise generating commands to control operation of the Web client 17. Numerous such products are known, including mice, trackballs, keyboards, and microphones (with voice recognition software). Although the Web client station 14 preferably includes one or more non-biometric I/O devices 18, it is to be recognized that the station 14 can omit such devices entirely, without departing from the principles of the invention.

The biometric I/O devices 16 comprise technologies that acquire selected data relating to biometric characteristics of the individual who is using the Web client station 14. The technologies commonly include one or more known hardware sensors and associated software drivers (not shown). Under control of the associated software driver, the sensor produces a signal representative of variations in the biometric characteristic presented. If, for example, the sensor is a microphone used to capture a voice pattern, the microphone will produce a signal whose amplitude (voltage or current) varies with time in response to the varying frequencies in a spoken phrase (a "voiceprint"). In addition to microphones, other sensors are known, including (i) various scanners for acquiring finger print or retinal pattern data and (ii) typing pattern sensors associated with keyboards.

It is to be recognized that various of the biometric I/O devices 16 and the non-biometric I/O devices 18 can be implemented in single physical units, without departing from the principles of the invention. For example, a microphone can provide for input of non-biometric data via voice recognition software as well as biometric data in the form of voice prints. As an additional example, a physical keyboard can provide for input of non-biometric data as well as biometric data in the form of typing patterns.

The biometric I/O devices 16 preferably provide the acquired data in acceptable form to the Web client 17, said form generally being representative of the acquired data. However, because the signals produced by most biometric sensors are analog, these signals generally are to be converted into digital form. To do so, an analog to digital converter ("ADC") typically is provided in association with the biometric I/O devices 16. It is noteworthy that many personal computers—the typical physical host for a logical Web client station 14—often provide an ADC operation in connection with integrated multimedia ports, e.g. microphone ports. Again, however, the logical representations of the Figures contemplate this integrated and any other disposition for the ADC and other physical devices, without departing from the principles of the invention.

Numerous products are known that can serve as biometric I/O devices 16. For example, fingertip technologies are offered by (i) National Registry, Inc., of Tampa, Florida ("NRI") and (ii) Mytec Technologies of Toronto, Canada. In turn, voice print technologies are offered by iNTELiTRAK Technologies of Austin, Tex.

The Web client station 14 further comprises an interface mechanism 28. The mechanism 28 receives the data acquired by the biometric I/O devices 16 which is provided to the authentication center 24 by the Web client station 14 via connection 22, e.g. via SSL. Depending on the Web client 17 and the selected secure transport protocol, either the Web client 17 or the interface mechanism 28 perform the tasks associated with the secure transport protocol. In a hybrid embodiment, it is contemplated that the Web client 17 performs such tasks as to the communication between the Web client station 14 and the Web server station 20, while the interface mechanism 28 performs such tasks as to the communication between the Web client station 14 and the authentication center 24.

The mechanism 28 controls the biometric I/O devices 16 responsive to parameters associated with respective Web server stations 20. These parameters preferably are received by the Web client 17 from the Web server station 20. To do so, parameters preferably are included in a download of a page from the Web server station 20, e.g., the station's home page as encountered by the Web client station 14 when initially seeking access. However, some or all of the parameters can be received otherwise, without departing from the principles of the invention.

The biometric I/O mechanism 28 preferably provides other functionality. For example, if the data received from the biometric I/O devices 16 is in improper form, the mechanism 28 preferably is enabled to control conditioning the data to a proper form, said form generally yet being representative of the acquired data. Moreover, the mechanism 28, in conjunction with the biometric I/O devices 16, preferably supports safeguards against biometric forgery, e.g., temperature sensing for fingerprint scanning. In addition, the mechanism 28, either with or without one or more of the biometric I/O devices 16, preferably is enabled to process the biometric data so as to enhance the efficiency of the authentication methods. The processing includes, for example, extracting unique features of the data and/or otherwise compressing the data. Although these and other functions are preferred, it is to be recognized that the mechanism 28 may include or omit one or more of the described functions or include additional functions, without departing from the principles of the invention.

The interface mechanism 28 preferably comprises one or more plug-ins to the browser program. Each plug-in can be associated with biometric data of single or plural types. In this manner, the mechanism 28 provides for modification, either to expand or limit the variety of supported biometric characteristics. While the mechanism 28 preferably supports biometric data of all, or substantially all, types, it is contemplated that the mechanism 28 can be limited to fewer number of types (e.g., only voice or finger print data), without departing from the principles of the invention.

The interface mechanism 28 can also be implemented as a Java applet. As an applet, it can be downloaded, e.g., from the Web server station 20 in the page carrying parameters. Moreover, when the Web client 17 is closed, the applet generally is destroyed. (For the purposes of this application, plug-in implementations are referred to as non-destructive and Java applets are referred to as destructive.

Figure 3:
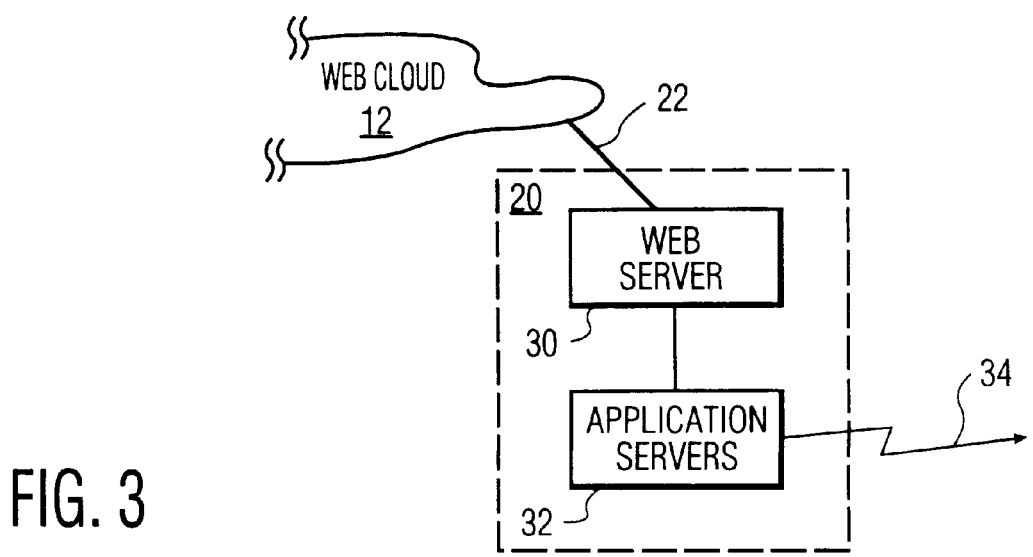
FIG. 3 is a block diagram of a server portion of FIG. 1, showing additional detail of the Web-based biometric authentication system, according to the present invention.

FIG. 3 shows an exemplary Web server station 20 in greater detail. The Web server station 20 comprises a Web server 30 for making information, services and other resources, including Web transactions, available to Web client stations 14. The Web server 30 preferably implements selected aspects of the authentication process hereof. For example, the Web server 30 preferably provides parameters of the biometric characteristics applicable to the Web client station 14 seeking access and participates in establishing the secure transport protocol, e.g. SSL.

The Web server station 20 preferably is associated with one or more application servers 32. For example, application servers 32 preferably are used to provide the information, services and other resources, including both Web and non-Web transactions, sought by an individual using the Web client station 14. The application servers 32, when used, generally have functions that depend on the entity operating them. In the case of a bank, the application servers 32 can include, among others, e-mail servers (e.g., for customer service), electronic funds transfer gateways, and electronic bill delivery servers.

The application servers 32 link to the Web client stations 14 via the Web cloud or otherwise. The links can be through the Web server station 20 via connections 22 or outside the Web server station 20 via connections 34. In this regard, it is to be understood that, although the application servers 32 are described and depicted in association with the Web client station 20, this description and depiction is a logical association, in that the Web server 30 of the station 20 participates in authenticating individuals for access, such access typically being of the associated application servers 32. As an example, any one or more of the application servers 32 can be physically remote from the other, as well as being physically remote from the Web server 20. In keeping with the logical association, the Web server 30 and the application servers 32 generally are, but need not be, operated by the same entity (e.g., the Web server 30 can be operated by the entity that operates the authentication center 24, which entity is other than that operating one or more of the application servers).

Figure 4:
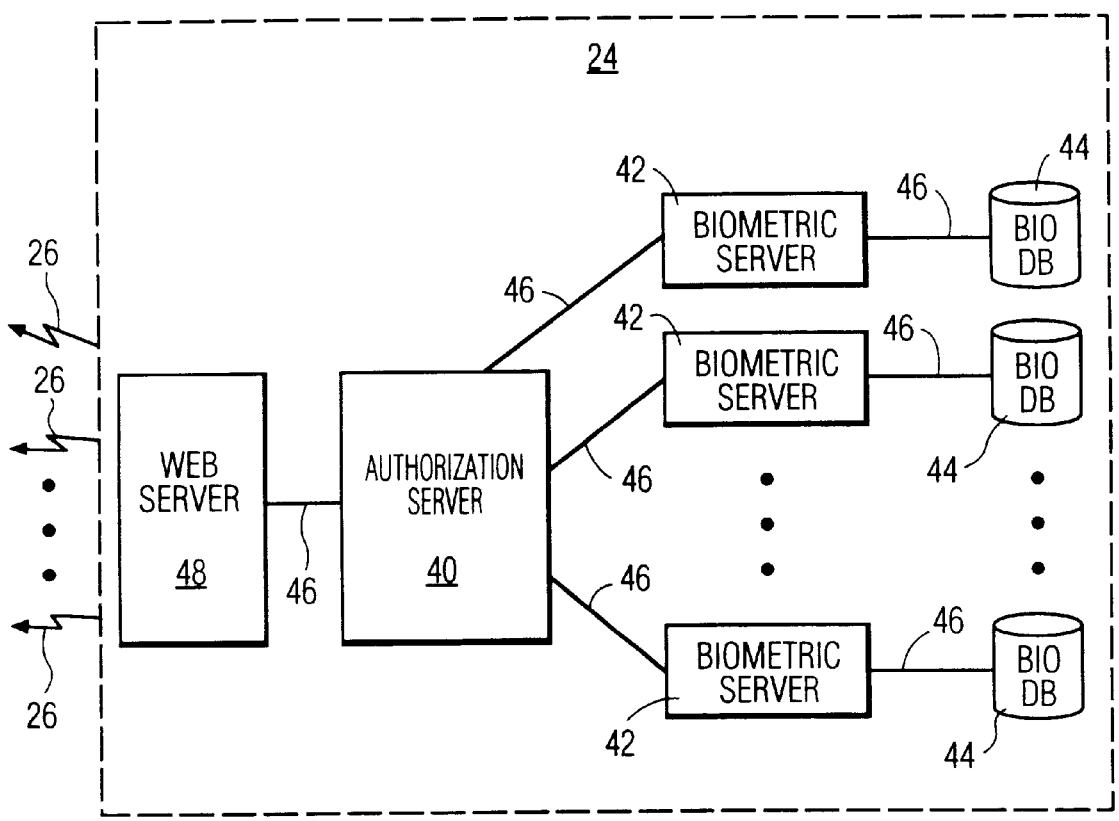
FIG. 4 is a block diagram of the authentication center of FIG. 1, showing additional detail of the Web-based biometric authentication system, according to the present invention.

FIG. 4 shows an exemplary authentication center 24 in greater detail. The center 24 comprises an authorization server 40 linked via element connections 46 to one or more biometric servers 42, each of which servers are, in turn, linked via element connections 46 to one or more associated biometric databases 44. The authorization server 40 controls communication between the center 24 and the other system elements 10. The biometric servers 42 compare the biometric data originating from the Web client servers 14, or data representative thereof, with the stored biometric data of enrolled individuals, such records being stored in the biometric databases 44.

The center 24 also can comprise a Web server 48, although it is to be understood that the Web server 48 can be omitted without departing from the principles of the invention. The Web server 48 provides for communication via pages.

The element connections 46 preferably support a secure transport protocol, such as SSL, so as to provide secure channels among the center's elements. In certain configurations of the system 10, element connections 46 support standard Web protocols, e.g., HTTP. Such configuration is contemplated, for instance, when the authentication center 24 is providing pages to the Web client station 14 relating to the authentication results.

Although FIG. 4 shows elements of the authentication center 24 logically together, it is to be recognized that the elements can be disposed at physically remote locations without departing from the principles of the invention. For example, any one or more of the biometric databases 44 can actually comprise plural databases, each physically remote from the other and physically remote from the associated biometric server 42, which itself can be physically remote from the authorization server 40.

Moreover, the authentication center 24 as a whole, or part or parts of it (e.g. the biometric databases 44) can be captive, i.e., operated integral with, or by the same entity as, one or more of the Web server 30 and/or the application servers 32 of each Web server station 20. In that structure, the entity can retain control over obtaining and maintaining the data, which can be important as the data generally comprises confidential information of their customers. In addition, the entity can make the data available to authentication centers 24 which are operated by different entities, either by providing copies of the databases or providing for access (e.g., via a secure channel) to the databases 44. These circumstances are contemplated for application typically in large enterprises that have such databases, or those having relatively high security needs, such as banks, insurance companies, large health-care organizations and government units. (Hereafter, the term "captive structure" generally will be used to designate configurations in which one or more biometric databases 44, with or without the authorization server 40, are created and controlled by the entity operating the Web server station.) By comparison, the authentication center 24 can be operated independently from the Web server station 20, i.e., operated neither integral with nor by the same entity as the Web server station 20. In that configuration, a different entity than that of the Web server station 20 typically controls the biometric databases 44. These circumstances are contemplated for application typically in smaller enterprises that generally do not have such databases or those having relatively low security needs, such as stores. (Hereafter, the term "independent structure" generally will be used to designate configurations in which the biometric databases 44 are not created or controlled by the entity operating the Web server station 20).

Operation and Methods.

The biometric authentication system 10 typically has two modes: enrollment and verification. In enrollment, individuals provide data to the authentication center 24 respecting their identity (e.g., by user name), by the Web location of the individual's Web client station 14 (e.g. a Uniform Resource Locator ("URL") or a network address), or by other identification token or a combination.

Preferably, enrollment includes confirmation, to a high degree of confidence and based on predetermined criteria, the individual's identity (i.e., that the individual being enrolled is, in fact, who that individual claims to be). Confirmation is generally accomplished by the entity operating the Web server station 20 in the captive structure. In the independent structure, confirmation is generally accomplished by the entity operating the center 24.

Although confirmation to a high degree of confidence is preferred, it is also contemplated that the enrollment can be otherwise. For example, the invention contemplates building an enrollment database of biometric data wherein such data is obtained from Web client stations 14 via the Web connections 22. For example, a Web-based store may opt to use such authentication, including as follows: the store receives an access request from an individual of a claimed identity; the individual's identity is authenticated based on biometric data previously enrolled via a Web connection; the store provides the goods; a subsequent access request is made from an individual claiming the identity of the previous access request; the individual's identity (a) is authenticated, such that new goods are provided only if payment was received for the previously-provided goods or (b) is not authenticated, such that new goods are provided if payment was not received for the previously-provided goods and, perhaps other factors (e.g., COD, value limits, etc.).

Enrollment preferably also includes an authorization check. Authorization can be to restrict system use to certain individuals. For example, authorization can be restricted to those who are members, clients, patients, etc. of the entity operating the Web server station or those who have paid some up front or continuing fees to use the service of the system 10.

While its use preferably is subject to authorization, access to the authentication center 24 (e.g., its data and operations) generally is highly secured.

Enrollment includes acquisition of data representing one or more of the individual's biometric characteristics. The authentication center 24 also preferably acquires multiple data samples during enrollment, so as to account for variations typically encountered in acquisition (and in verification mode) and, thereby, to increase the reliability of authentication (i.e., reduce false negatives and positives).

Enrollment includes the storing of each enrolled individual's biometric data in association with the individual's identity, as confirmed. Enrollment can include other aspects without departing from the principles of the invention. For example, the biometric data can be examined to determine if biometric features are represented adequately to support reliable authentication. In addition, the individual's records can include an audit record of Web server stations 20 in connection with which the individual has been authenticated or is known to be authorized. In addition, enrollment can establish an encryption algorithm for communication between the center 24 and the client 14. Moreover, enrollment can include certification that the biometric data is unique to the individual being enrolled, i.e. no one by a different identity has previously enrolled with that data.

In verification, the authorization server 40 receives encrypted messages carrying, for example, biometric data and the individual's claimed identity. The authorization server 40 preferably filters out unacceptable messages. Unacceptable messages can include those carrying a claimed identity that does not agree (on any predetermined statistical basis) with any records available at the authentication center 24. In this case, unacceptable messages, for example, can include those (i) associated (e.g., by user name or id) with individuals who are not enrolled with the center 24 or (ii) associated (e.g., by the URL or a network location) with Web client stations 14 that are not registered with the center 24.

The authorization server 40 preferably decrypts acceptable messages and passes them to a biometric server 42. (However, it is to be recognized that the messages can be passed to the biometric server 42 without first being decrypted, in which case the biometric server 42 performs the decryption.) The messages are passed to the biometric servers 42 via element connectors 46, i.e., using a channel supporting SSL or some other security protocol. The biometric server 42 of each passed message can be determined by various factors, including (i) the server 42 has enrolled the claimed identity of the individual seeking authentication, and (ii) the server has associated with it the Web server station 20 of which access is being sought, which data is preferably transmitted to the center 24 with the biometric data. Accordingly, the authorization server 40 preferably supports enrollment of an individual with respect to plural Web server stations 20, each of which stations, for example, is in a captive structure with the authentication center 24, i.e., has control of a captive biometric database 44 that includes records associated with the individual. The authorization server 40 preferably also supports enrollments associated with entirely independent structures, as well as with combinations of both configurations.

In configurations using passwords, the biometric server 42 preferably determines whether the transmitted password matches the password of record. The biometric server 42 can obtain the passwords of record in various ways. In a captive structure, the authentication center 24 has access to the applicable databases of the entity operating the Web server station 20, including the databases 44 that maintain passwords. Accordingly, as non-biometric passwords are added, dropped, or changed in the captive case, the authentication center 24 has automatic access to the new passwords. In an independent structure, the authentication center 24 generally is without access to the passwords of the Web server station's database. Accordingly, the center 24 generally either/both maintains a password file (e.g., from enrollment) or obtains the password, in encrypted form, from the Web server station 20 to match against that submitted for authentication.

The biometric server 42 preferably processes the biometric data, including (i) to extract unique features of the biometric data, (ii) to enhance distinguishing aspects, and/or (iii) to compress the data. For example, with finger prints, the server 42 preferably extracts the minutiae of the scanned fingerprint image for comparison to similar features extracted during each individual's enrollment. It is to be recognized, however, that this extraction may be omitted with respect to one or more types of biometric data, including fingerprint data, without departing from the principles of the invention.

The biometric server 42 compares the biometric data of each passed message with the records stored in the server's associated biometric databases 44. To verify the individual's claimed identity, the biometric server 42 typically compares the biometric data to the records of the enrolled individual whose associated identity agrees with the claimed identity of the passed message. (Herein, "agrees with" means "is equivalent to within a predefined statistical level of confidence.")

Rather than verification, the comparison can be to identify the individual. To perform identification, the biometric servers 42 typically compare the live data to all records in their associated biometric databases 44, so as to determine if there is a sufficient match. If such match is found, the center 24 returns the identity (or identities) associated with the matching record(s). It is to be understood that, unless the context militates otherwise, the description herein of the verification mode embraces both verification and identification, and all without departing from the principles of the invention.

The biometric server 42 can obtain access to biometric records in various ways. In a captive structure, the authentication center 24 has access to the applicable databases of the entity operating the Web server station 20, including the biometric databases 44. Accordingly, whether biometric records are added, dropped, or changed in the captive case, the authentication center 24 has automatic access to them. In an independent structure, the authentication center 24 generally is without access to the Web server station's database. Accordingly, the center 24 generally creates and maintains its own biometric databases, via enrollment of individuals.

An individual's live data typically fails to match exactly the individual's records. This occurs because acquisition of biometric data is subject to variations, both in the enrollment mode and in verification mode. Accordingly, the biometric servers 42 preferably employ comparison algorithms that do not require exact matches between the live data and records. Instead, the comparison algorithms generally are implemented to determine the statistical closeness of the live data to the records. In that implementation, the biometric servers 42 produce an affirmative response in the event of a sufficient match, i.e., if the closeness determination yields a result that falls into a selected range of confidence determined to be acceptable. On the other hand, the biometric servers 42 produce a negative response if the result falls into a selected range of confidence determined to be unacceptable. The biometric servers 42 preferably also support an indeterminate response (e.g., try again/provide more data) if the above ranges are not complementary and the result falls between such ranges. The indeterminate response can also result for other reasons, including that the authentication center 24 is at fault (e.g., is down, busy or otherwise).

The ranges may be selected under one or more criteria, and the criteria may vary among biometric characteristics. For example, one or more ranges may be selected solely to conform to statistical data, such as studies. In addition, one or more ranges may be selected by the administrator of the system 10, or by the administrator of the Web server station 20, or by a combination of either or both, with or without statistical data. In any case, optimum selections are generally selected to strike a selected balance between false positives and false negatives.

Following each authentication, the authentication center 24 produces a response. The center 24 provides the response, whatever its nature, to either/both the Web server station 20 and the Web client station 14, the routing of the response depending on the configuration of the system 10. In the case of a negative response, the center 24 preferably provides the response only to the Web client station 14. In that case, however, the authentication center 24 preferably records the details of the authentication process so as to create a biometric audit trail, as described below.

The center 24 can download a response to the Web client station 14 and to the Web server station 20 in various ways. As an example, the center 24 can prepare and download to either or both stations 14, 20 a message that comprises a selected representation of the result of the comparison (e.g., pass, fail, confidence level, etc.), the message being suitable for downloading via the secure transport protocol or protocols in place between the center 24 and respective stations. As another example, to do so respecting the Web client station 14, the authentication center 24 can download a page having electronic links that provide access to one or more of the application servers 32 of the Web server station 20, which access generally is subject to the individual's authorization at such station 20 and/or with each such server 32. In such case, the authentication server 24 includes a Web server 48 so as to support the Web protocols, e.g., HTTP/HTML. Also in such case, the page can include or activate only those electronic links that are appropriate to the confidence level attained in the authentication, i.e., levels of access can be supported. As yet another example, to respond to the Web server station 20, the authentication center 24 can, in a captive structure, make an appropriate entry (e.g., set a flag and/or provide other data to distinguish the authentication for the particular session) in the biometric database 44.

In another case, the center 24 can download the response to the Web client station 14 while routing the response to the Web server station 20 via the Web client station 14, without departing from the principles of the invention. To do so, the authentication center 24 can send to the station 14 a digital certificate, which certificate the center 24 encrypts with data that distinguishes the authentication for the particular for the particular client and server stations of the instant session and which certificate the center 24 preferably generates in accordance with principles understood in the art.

Figure 5:
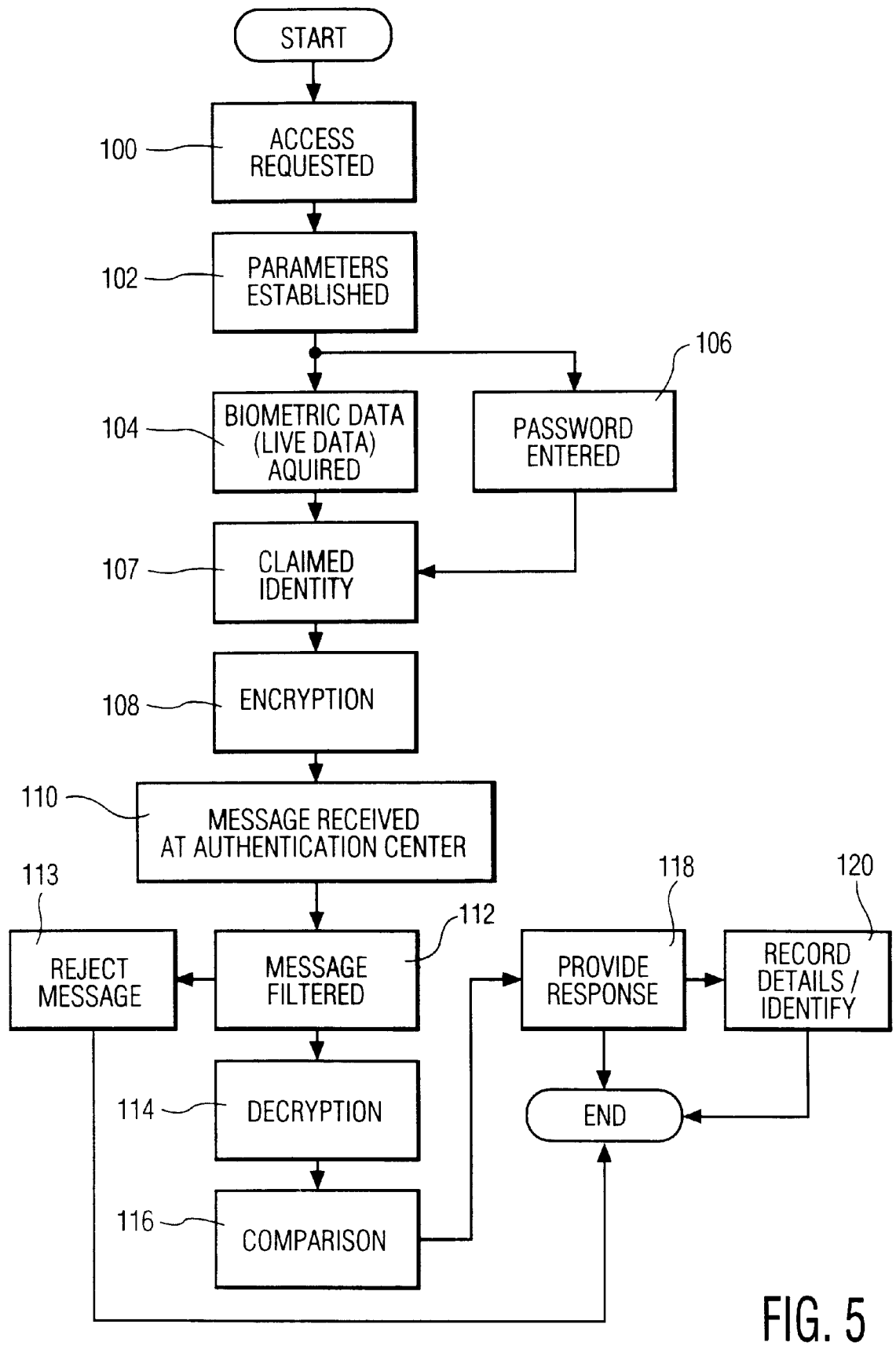
FIG. 5 is a flow-chart showing steps generally associated with authentication using a Web-based biometric authentication system, according to the invention.

Turning to FIG. 5, a flow chart is shown that depicts the operation of the biometric authentication system 10, according to the present invention. In step 100, the Web client station 14 requests access of a Web server station 20. The station 14 typically does so by entering the Web location of the Web server station 20, such location being in the form of a Uniform Resource Locator ("URL"). In this step, a secure communication channel is established between the Web client and server stations, via the Web cloud 12. For example, if SSL is employed, the secure communication channel is established during the SSL handshake, including by, among other things, (i) negotiating an encryption algorithm between the stations 14, 20 via the Web cloud 12 and (ii) authenticating the Web server station 20 to the Web client station 14.

In step 102, parameters are established at the Web client station 14. The parameters are associated with the biometric data to be used in authenticating the individual seeking access of the particular Web server station 20. As previously described, the parameters preferably are provided to the Web client station 14 from the Web server station 20 by downloading a page from station 20 using HTTP over SSL. However, it is to be recognized that the parameters can be established otherwise, without departing from the principles of the invention.

In step 104, the biometric I/O devices 16 associated with the parameters acquire the individual's biometric data. The acquisition is controlled by the biometric I/O mechanism 28.

In step 106, which may occur prior or subsequent to, or simultaneous with, step 104, the individual enters a password. The password can be entered using either a non-biometric I/O device 18 (e.g., a keyboard or a voice-recognition microphone) or a biometric I/O device 16 (e.g., a microphone acquiring voice prints). In the latter case, the password preferably is integral to the biometric data. The password can be predetermined or volatile, volatile passwords being associated with only the instant session, without departing from the principles of the invention. In the case of volatile passwords, they preferably are generated by the Web server station 20 and provided (i) to the Web client station 14 in the download and (ii) to the authentication center 24 either via the Web client station 14 (forwarded in encrypted form) or via download or, if a captive structure, by placement in the biometric database 44 maintained by the station 20.

In step 107, the Web client station 14 provides for the individual's claimed identity. As previously stated, the claimed identity can be indicated by the individual's user name or user id, by the Web location of the individual's Web client station 14, or by other identification token or by combination.

In step 108, encryption is performed. Preferably, both the password and the biometric data, or data representative thereof, are encrypted.

In step 110, a message is received at an authentication center 24. The message preferably is received via one or more secure communication channels, e.g., a channel supporting SSL or some other security protocol. Furthermore, the message preferably is downloaded to the center 24, bypassing the Web server station 20. However, the message can be routed to the center 24 via the Web server station 20, without departing from the principles of the invention.

In step 112, the authentication center 24 filters out unacceptable messages. Unacceptable messages are described above. If a message is filtered out, the center 24 preferably sends a predetermined reject message to the Web client station 14, as shown by step 113. Although it is not shown, a reject message can also be sent to the Web server station 20, without departing from the principles of the invention.

In step 114, the authentication center 24 decrypts acceptable messages. This decrypting action is to recover the biometric data and, if used, the password.

In step 116, the live data (e.g., the acquired biometric data or data representative thereof, wherever such representative data is obtained by processing acquired biometric data) is compared to selected records of the enrolled individual whose associated identity agrees with the claimed identity of the message. Prior to the comparison, the live data preferably is passed by the authorization server 40 to an appropriate biometric server 42.

Step 116 can also include comparison of the received password to the password associated with the enrolled individual whose identity agrees with the claimed identity.

As previously discussed, the system 10 contemplates an authentication center 24 supporting more than one biometric server 42. In turn, the method for using the system 10 contemplates using said support to advantage. For example, as previously described with reference to FIG. 4, each biometric server 42 can be used to authenticate in relation to a respective one of the Web server stations 20. As another example, however, a plurality of biometric servers 42 can be used to authenticate in relation to a single Web server station 20. In that latter example, the biometric servers 42 can be organized to authenticate in parallel, serially or in combinations of both. The parallel authentication can be implemented for various purposes, including (i) for redundancy, (ii) to employ various tests or comparison algorithms to one biometric data type or (iii) to employ respective comparison algorithms to various biometric data types. The serial authentication can be implemented for various purposes, including to create a series of hurdles erected to provide levels of access or merely to establish a concatenated authentication.

In step 118, based on the result of the comparison, the authentication center 24 provides a response, after which the authentication process preferably terminates. Although termination is preferred, it is contemplated that, under predetermined circumstances, additional authentication processing may be initiated, without departing from the principles of the invention. As an example, if the receipt of data is flawed or the center 24 experiences a problem, the center 24 can be configured to initiate additional biometric processing, e.g., by sending a page from the Web server 48 to the Web client station 14, the page suggesting additional or substitute data, with or without notification to the Web server station 20. As another example, in the event of positive verification of identity such that access is granted and a session is being conducted, the system 10 can be configured to initiate additional biometric processing in the form of continuous, regular or random re-authentications during the session. In such case, typing pattern or finger print data can be acquired in the background (software monitors keystrokes or keyboards have scanners) and transmitted to the center 24 for authentication. Re-authentications combat against crackers taking advantage of a Web client station 14 left unattended during a session by an authenticated individual.

Moreover, additional processing is contemplated in response to negative verification of identity. In that regard, step 120 provides that the authentication center 24 records the details of the authentication process. These details included one or more of the time, the date, all or selected biometric data, the password, the Web client station 14 and the Web server station 20. These records create a biometric audit trail so as to discourage repeated attempts of illegitimate individuals and to enhance opportunities to capture crackers. Indeed, the authentication system can be used, following failed verification or otherwise, to perform an identification process, wherein records of all enrolled individuals are compared to the live data of the failed authentication. This effort preferably can be extended to similar centers and can be part of the enrollment process. If the purpose is to identify crackers and one is so identified, the cracker can more readily be prosecuted, if merited, or otherwise stripped of power to impact the Web server stations 20, other Web entities, or this system 10.

The steps described above can be configured to support various options, without departing from the principles of the invention. For example, to authenticate based on voice prints, the steps can be configured so that the individual speaks a password, e.g., a multi-digit word or phrase, which password is isolated from the voice print at the authentication center 24 for comparison to a predetermined password. Accordingly, both the password and the voiceprint must sufficiently match for an affirmative authentication.

As another example, data of plural biometric characteristics can be combined to increase overall confidence in the authentication. Although combination is generally subject to cost/benefit trade-offs, entities offering Web information, services and other resources, including transactions, can be expected to set their own security demands. In such case, the level of security associated with each biometric characteristic alone preferably is categorized. Similarly, the overall levels of security associated with combinations of characteristics preferably are categorized. These data points typically would be available to each Web server station 20 in configuring their usage of the Web-based biometric authentication system.

In another configuration example, the system 10 can be used with or without passwords. To illustrate, an emergency room clinician can scan the fingerprint of an unconscious patient not only to gain access to the patient's records, but also perhaps to identify the individual. In either case, a password is both unnecessary and undesirable, while authentication both protects the records, guards patients' privacy and allows vital care to be performed appropriate to the individual.

Parameters.

The content of the parameters varies according to the configuration of the system. That is, parameters vary according to whether the system is entirely captive (i.e., the authentication center is operated by the same entity that operates the Web server station 20), partially captive ( e.g., the entity operating the Web server station 20 as a whole, or one or more application servers 32, makes its biometric databases 44 available to the separately operated authentication center 24, which is also operating the Web server 30 of the Web server station 20) or independent (e.g., the authentication center 24 enrolls individuals and provides an authentication service respecting its enrolled individuals to those entities operating one or more Web server stations 20).

Examples of parameters that can be used, include: (i) one or more specific biometric characteristics for use in authentication, with or without alternatives; (ii) a number of biometric characteristics to be used, without specifics as to which types can be used; (iii) criteria for authentication, including both selection among comparison algorithms and the confidence range or ranges for determining whether a sufficient match is obtained; (iv) how responses are to be routed to the station 20, including whether and, if so, what form of digital certificate is acceptable; (v) how biometric data is to be routed to the authentication center 24; (vi) which authentication center 24 is to be used or, assuming the individual is enrolled at more than one center, from which centers the applicable center is to be selected or the criteria for selection (e.g., "XXX"-certified centers); (vii) whether and, if so, which parameters can be modified and the mechanism for doing so; (viii) whether and, if so, what further processing can be performed after an individual is not authenticated, and (ix) data specific to the endeavors conducted by the entity operating the Web server station, e.g., bank account number, patient number, employee number, etc. While one or more of the above parameters can be used, other or additional parameters can be used, without departing from the principles of the invention.

As previously described, parameters preferably are included in a download of a page from the Web server station 20, e.g., the station's home page as encountered by the Web client station 14 when initially seeking access. Indeed, the downloaded page can include parameters that offer alternatives that are selectable. The selection can be made at the individual's volition (e.g., the biometric characteristic or combinations that are acceptable to the individual), automatically by the Web client station 14 (e.g., based on supported biometric characteristics), by the authentication center 24 (i.e., the Web client station 14 forwards the alternatives to the center 24), or by combinations of these or otherwise.

However, some or all of the parameters can be established otherwise, without departing from the principles of the invention. For example, after the first downloaded page, parameters can be communicated from the Web server station 20 in one or more subsequently downloaded pages from the Web server station 20. These parameters can be supplementary, substitutional or negotiable in nature. As a further example, some or all of the parameters either can be communicated from the authentication center 24 or can be communicated from within the Web client station 14 to itself ("local availability"). Moreover, the parameters can be established through communications involving any combination of these sources, without departing from the principles of the invention.

Local availability at the Web client station 14 can be used, for example, where the parameters are unchanging or where received parameters are incompatible with that station 14. One form of local availability is storage. Storage is initiated by the individual, or is performed automatically at the Web client station 14 in response to the station's detection of a selected trigger, e.g., a certain total number of access attempts or an access frequency threshold. The automatic storage, if supported, preferably is controlled by the interface mechanism 28. Another form of local availability is to enable the station 14 to make selections from alternatives (see above) or to enable the station 14 to be responsive to incompatibility. For example, if biometric data associated with received parameters cannot be provided by the Web client station 14 (which can be an issue particularly in independent structures), the mechanism 28 preferably is enabled either/both to (i) request permission to send alternative biometric data (e.g., based on the Web client station's capabilities) or (ii) obtain and transmit other biometric data of its own selection.

Communication of parameters from the authentication center 24 can be in place of communication from the Web server station 20 and the Web client station 14. In addition, communication from the center 24 can supplement the communication(s) from the stations 20, 14, as well as other communication from the center 24 itself. Communications from the center 24 can also be negotiable with other communications.

Supplementary communication, from whatever source, can be used, for example, where the existing parameters can be incompatible with the Web client station 14. That incompatibility, which can be an issue particularly in independent structures, can arise due to various factors, including, without exhaustion: (i) a biometric I/O device 16 associated with a parameter is absent or, if present, is not functional; (ii) the interface mechanism 28 fails to support a biometric I/O device 16 associated with a parameter; (iii) the individual is unable to provide biometric data associated with a parameter; and (iv) the individual is unwilling to provide certain biometric data as a matter of principle, e.g., that data violates privacy or religious issues.

Supplementary transmission, from whatever source, can be used, in another example, where the existing parameters can be incompatible with the authentication center 24. That incompatibility, which can be an issue particularly in independent structures, can arise due to various factors, including, without exhaustion: (i) the authentication station 24 does not support authentication based on biometric data associated with one or more existing parameters, e.g., the individual did not provide such data when enrolling with the center 24; (ii) the center suffers a complete or partial failure of elements respecting biometric data associated with one or more of the existing parameters; and (iii) the individual's identity cannot be verified to obtain a sufficient match using the biometric data of the existing parameters, but the system 10 is configured, at least with respect to the instant Web server station 20, to allow opportunity to authenticate using additional or different biometric data.

As described above, it will be apparent to one skilled in the art that the invention contemplates establishing parameters using various communications and methods. As to the Web client station 14, the methods include (i) local availability, with or without parameters from the Web server station 20 or the authentication center 24, or (ii) single or plural downloads to the Web client station 14 from either or both the Web server station 20 or the authentication center 24, with or without locally-provided parameters, or (iii) communication of parameters (supplementary, substitutional or negotiable) involving any combination of the Web client station 14, the Web server station 20 and the authentication station 24, using arbitration algorithms as appropriate.

As to the authentication center 24, parameters typically focus on what data is to be analyzed, the criteria for authentication, including the algorithms to be used and the confidence range or ranges for determining whether there is a sufficient match, and where and how response data is to be routed, including whether and, if so, what form of digital certificates are acceptable. In any particular configuration, one or more of these matters can be fixed, i.e., the parameters are established locally. For example, the center 24 may support only two types of data, with one algorithm for each. However, these and other matters can be selectable, in which case the selectable parameters are preferably established by the Web server station 20 in accordance with its security needs. In any case, any parameters selected preferably are transmitted to the center 24 with the biometric data. It is to be recognized, however, that such parameters can be otherwise directed to the center 24: for example, the Web server station 20 can download parameters to the center 24 (e.g., a multicast of the page containing the parameters) or, in a captive structure, can make the parameters available via the biometric database 44.

Except for the case of establishing parameters from a single source in a single transmission, the system 10 preferably provides for arbitration among the Web client station 14, the Web server station 20 and the authentication center 24 so as to finally establish the parameters to be used in the authentication.

Authentication Center.

The biometric data originates at the Web client station 14 and is received at the authentication center 24 for analysis. Preferably the data is downloaded from the station 14 to the authentication center 24, bypassing the Web server station 20. However, the data can be routed from the station 14 to the center 24 via the Web server station 20, without departing from the principles of the invention.

Particularly in an independent structure, plural authentication centers 24 can be available, such that a determination is to be made of the particular authentication center that will perform the authentication steps associated therewith. The determination responds to various issues, including: (i) with which center or centers 24 the individual and/or client station 14 is enrolled; (ii) if enrolled at plural centers 24, what biometric data is stored in records of each center; and (iii) what center or centers, or types of centers, does the Web server station 20 accept, e.g., it is registered with one or more centers or it requires certain algorithms, certifications or services.

In the wholly captive structure, the authentication center is determined by the structure. In effect, it is a matter of predetermination: e.g., the bank operates the Web server station 20 for its customers who are the individuals operating the Web client stations 14, the customers having registered with the captive authentication center 24 when opening their respective bank accounts.

In the independent structure, the authentication center 24 preferably is determined by either or both the Web client station and the Web server station. Typically, this is on a per access request basis.

This determination preferably is by the Web client station 14. This is preferred because (i) the station 14 has its associated enrollment data and (ii) the station 14 preferably downloads live data to the center 24, by-passing the Web server station 20 This determination can be made with or without input from the Web server station 20. For example, the station 14 can identify the center 24 to the station 20 for approval. If the Web server station 20 finds the so identified center 24 unacceptable, the station 20 can request a re-determination, e.g., that some other center 24 be used.

If the Web client station 14 determines, it preferably sends the Web server station's identification to the center 24, if the center 24 is to download a response directly to the Web server station 20. The identification of the Web server station 20 can also be to enable the center 24 to authenticate in accordance with the Web server station's selected criteria, assuming that the criteria are stored at the center 24 (e.g., the station 20 subscribes for the service, providing such criteria). If the center 24 is configured to support generation of digital certificates, the identification of the server station 20, as well as other data (e.g., the parameters) can also be to allow encryption of that data within the certificate.

Independent structure also can support the Web server station 20 determining a particular authentication center 24. In that case, if the Web client station 14 is to download the biometric data directly to the authentication center 24, the Web server station 20 preferably includes the center's identification as a parameter provided to the Web client station 14, e.g., in the download of a page to the Web client station 14. However, if the Web client station 14 is to route the biometric data to the authentication center 24 via the Web server station 20, the station 20 preferably selects the center 24 when transmitting the biometric data to that center and no such parameter need be provided to the station 14. In cases of such routing and center 24, the biometric data from the Web client station 14 preferably is accompanied by identification of the authentication center or centers 24 at which the individual is enrolled, simply because the individual typically is enrolled at limited numbers of centers 24.

The systems methods according to this invention, including the described embodiments, provide various advantages. Some of the advantages include, for example: biometric data is logically available at a central location—the authentication center 24—for authenticating individuals within the context of their Web-based transactions; authentication is generally rapid, reliable and secure; except for nominal interaction with biometric I/O devices 16, the authentication is generally transparent to the individual; the system is relatively cost effective, especially compared to systems using custom hardware and software solutions; the authentication is highly scalable and yet, by definition, personal; and the authentication benefits from flexibility, both (i) in terms of providing various levels of confidence available to and selectable by each entity requiring authentication and (ii) in terms of providing alternative biometric characteristics for selection by each individual, responsive to the individual's (or, as the case may be, their Web client station's) abilities, impairments and principles.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A method for Web-based, biometric authentication of individuals who are using a Web Client station, the individuals seeking access of a Web server station, the method comprising the steps of:

establishing parameters associated with selected biometric characteristics to be used in authentication;

acquiring, at the Web client station, biometric data from an individual in accordance with the parameters;

receiving, at an authentication center, a message that includes live data comprising the acquired biometric data from the individual seeking access of the Web server station;

selecting, at the authentication center, one or more records from among records associated with one or more enrolled individuals;

comparing the live data with selected records, the comparison determining whether the so-compared live data sufficiently matches the selected records as to authenticate the individual seeking access;

recording selected details of the received message and the results of the comparing step so as to create a biometric audit trail; and when an individual fails authentication, using selected details of the received message, and comparing said selected details with a plurality of records, the comparison determining whether the so-compared selected details sufficiently match any one or more of the so-compared records, so as to identify the individual seeking unauthorized access of the Web server station.

2. A method as claimed in claim 1, wherein said step of comparing said selected details with a plurality of records where an individual fails authentication comprises using, as the plurality of records, biometric data records of said authentication center and also biometric data records of at least one additional authentication center.

3. A method as claimed in claim 1, wherein said live data includes a voice print and the selected records include voice print data.

4. A method as claimed in claim 1, further comprising the steps of:

providing, at the Web client station, a claimed identity associated with the individual;

receiving, at the authentication center, a message that includes the claimed identity;

determining the acceptability of the message based on the claimed identity;

if the message is acceptable, providing, at the authentication center, selected records that agree with the claimed identity; and comparing the received data with the so-provided, selected records.

5. A method as claimed in claim 1, further comprising the step of providing, from the authentication center, a response respecting the result of the comparing step, this providing step comprising the steps of:

(A) preparing the response, which step includes one or more of the following steps:
(i) preparing a digital certificate;
(ii) preparing a page having electronic links to accessible pages associated with one or more application servers;
(iii) preparing an appropriate entry in a biometric database; and
(iv) preparing a secure protocol message; and (B) effecting the response, which step includes one or more of the following steps:
(i) downloading the response to the Web server station;
(ii) routing the response to the Web server station via the Web client station;
(iii) making an appropriate entry in a selected biometric;
(iv) downloading the response to the Web client station; and
(v) routing the response to the Web client station via the Web server station.

6. A method as claimed in claim 5, wherein the step of preparing a page having electronic links comprises including or activating only those electronic links that are appropriate to the confidence level attained in the comparing step.

7. A method as claimed in claim 1, further comprising the step of establishing secure communication channels in and among the Web client station, the Web server station and the authentication station.

8. A method as claimed in claim 7, wherein the step of establishing secure communication channels comprises:

(A) employing a Web client at the Web client station and a Web server at the Web server station, the Web client and the Web server providing for establishing a secure communication channel between the Web client station and the Web server station; and (B) employing an interface mechanism at the Web client station and an authorization server at the authentication center, the interface mechanism and the authorization server providing for establishing a secure communication channel between the Web client station and the authentication center.

9. A method as claimed in claim 1, wherein:

the acquiring step comprises plural acquisitions, said plural acquisitions relating to one or more biometric characteristics; and the establishing parameters step further comprises at least one of the following steps:
(i) selecting a confidence level from among supported confidence levels, said supported confidence levels being categorized in relation to authentication based on using biometric data associated with single biometric characteristics and with combinations of biometric characteristics; and
(ii) selecting a trigger event, said trigger event causing the acquisition of biometric data.

10. A method as claimed in claim 9, wherein the step of selecting a trigger event comprises selected a time interval for repeating the authentication steps.

11. A method as claimed in claim 1, wherein the step of establishing parameters comprises one or more communications by and among the Web server station, the Web client station and the authentication center.

12. A method as claimed in claim 11, wherein the step of establishing parameters further comprises the step of choosing among negotiable parameters by using predetermined arbitration algorithms.

13. A method as claimed in claim 11, wherein the step of establishing parameters further comprises downloading a page from the Web server station to the Web client station responsive to the Web client station requesting access of the Web server station, the page including parameters.

14. A method as claimed in claim 1, further comprising the step of determining an authentication center from among plural authentication centers.

* * * * *